(12) United States Patent
Stevens

(10) Patent No.: US 9,370,979 B2
(45) Date of Patent: Jun. 21, 2016

(54) AMPHIBIOUS VEHICLE

(71) Applicant: Ross Anthony Stevens, Cleveland (AU)

(72) Inventor: Ross Anthony Stevens, Cleveland (AU)

( * ) Notice: Subject to any disclaimer, the term of this patent is extended or adjusted under 35 U.S.C. 154(b) by 0 days.

(21) Appl. No.: 14/354,768

(22) PCT Filed: Oct. 28, 2012

(86) PCT No.: PCT/AU2012/001308
§ 371 (c)(1),
(2) Date: Apr. 28, 2014

(87) PCT Pub. No.: WO2013/059875
PCT Pub. Date: May 2, 2013

(65) Prior Publication Data
US 2014/0335748 A1 Nov. 13, 2014

(30) Foreign Application Priority Data
Oct. 28, 2011 (AU) .................................. 2011904513

(51) Int. Cl.
*B63C 13/00* (2006.01)
*B60F 3/00* (2006.01)

(52) U.S. Cl.
CPC ................. *B60F 3/0007* (2013.01); *B60F 3/00* (2013.01); *B63C 13/00* (2013.01); *B60F 2301/00* (2013.01); *B60F 2301/02* (2013.01)

(58) Field of Classification Search
CPC ............................... B60F 3/0007; B63C 13/00
USPC ...................................................... 440/12.66
See application file for complete search history.

(56) References Cited

U.S. PATENT DOCUMENTS

| 4,008,679 | A | * | 2/1977 | Bozzano | ................. B63C 13/00 114/344 |
| 5,176,098 | A | * | 1/1993 | Royle | ................... B60F 3/0007 114/344 |
| 5,562,066 | A | * | 10/1996 | Gere | ..................... B60F 3/0007 440/12.51 |
| 6,364,723 | B1 | * | 4/2002 | Hite | ..................... B60F 3/0069 440/12.5 |

(Continued)

FOREIGN PATENT DOCUMENTS

| CN | 2480183 Y | 3/2002 |
| WO | 9315923 A1 | 8/1993 |

(Continued)

OTHER PUBLICATIONS

PCT, International Search Report for PCT/AU2012/001308 issued on Mar. 15, 2013 (4 pages).

*Primary Examiner* — Lars A Olson
*Assistant Examiner* — Jovon Hayes

(57) ABSTRACT

There is provided an amphibious vehicle including a plate aluminum planing boat hull (10) having a transverse collision bulkhead (12) and a pair of recesses (13) disposed each side of the stem (14). Transom portions (17) are located at either side of a central pod (21). The collision bulkhead (12) and the transom portions (17) support respective pairs of extendable strut and wheel assemblies (24) each comprising a mounting bracket (25) and a coil spring over shock absorber assembly (27). Spaced suspension rods 31 extend through the bottom of the bracket to provide for suspension travel to stop (35). The upper ends of the suspension rods are secured to a header assembly (36) which forms the upper mount for a wheel strut assembly (37) consisting of double acting hydraulic ram (40) secured to a strut casing (44) of square section passing through a bearing pack assembly (46) mounted to the suspension rods (31).

14 Claims, 8 Drawing Sheets

(56) References Cited

U.S. PATENT DOCUMENTS

| | | | | |
|---|---|---|---|---|
| 6,394,017 | B2* | 5/2002 | Pavon | B63C 13/00 114/344 |
| 7,004,801 | B2* | 2/2006 | Bryham | B60F 3/0007 114/344 |
| 7,128,175 | B1* | 10/2006 | Martineau | B60F 3/0007 180/22 |
| 8,668,535 | B1* | 3/2014 | Scroggs | B63H 19/08 440/12.66 |
| 2014/0335748 | A1* | 11/2014 | Stevens | B60F 3/00 440/12.66 |

FOREIGN PATENT DOCUMENTS

| | | |
|---|---|---|
| WO | 02087908 A1 | 11/2002 |
| WO | 03051712 A1 | 6/2003 |
| WO | 2005028300 A1 | 3/2005 |

\* cited by examiner

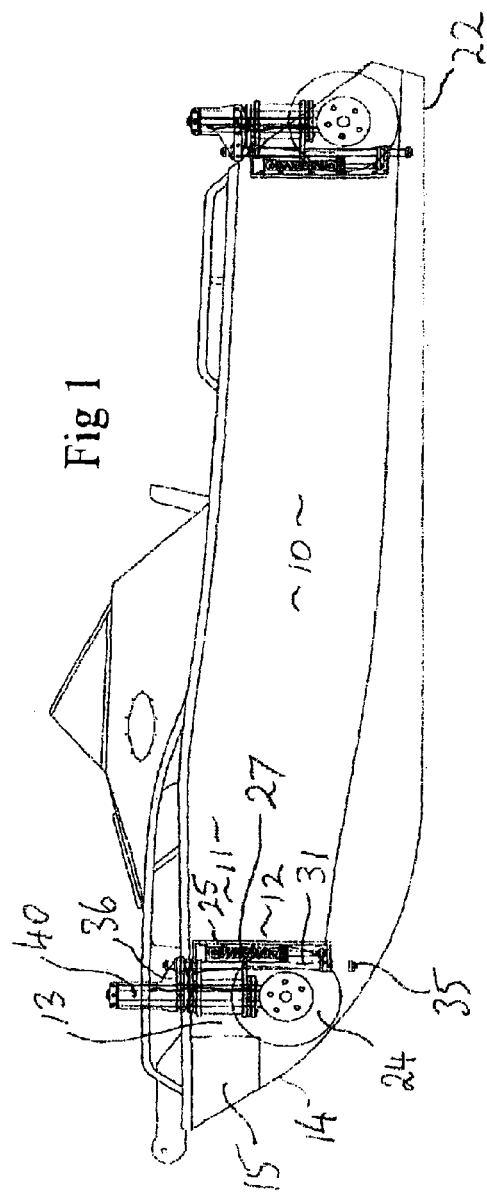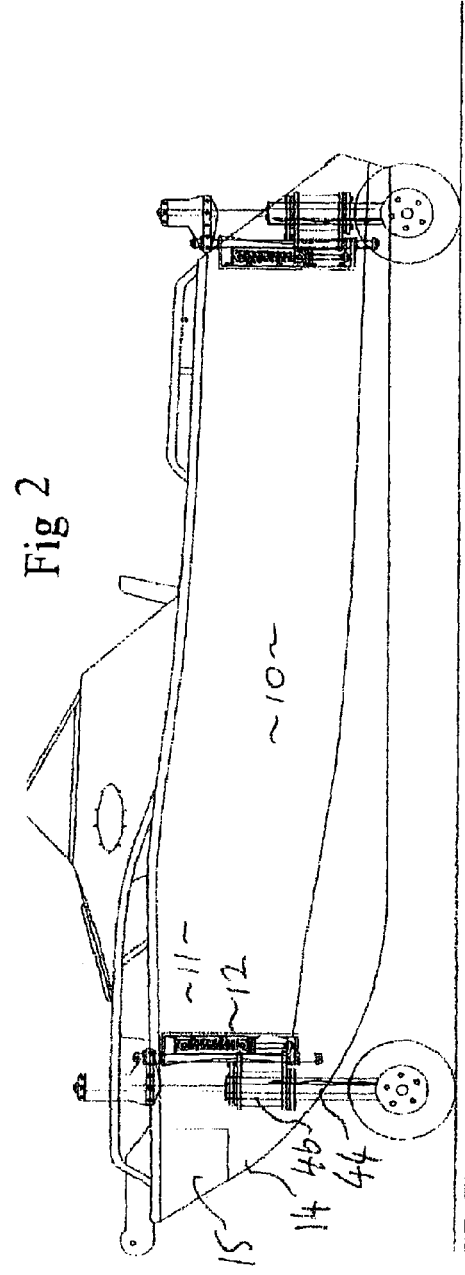

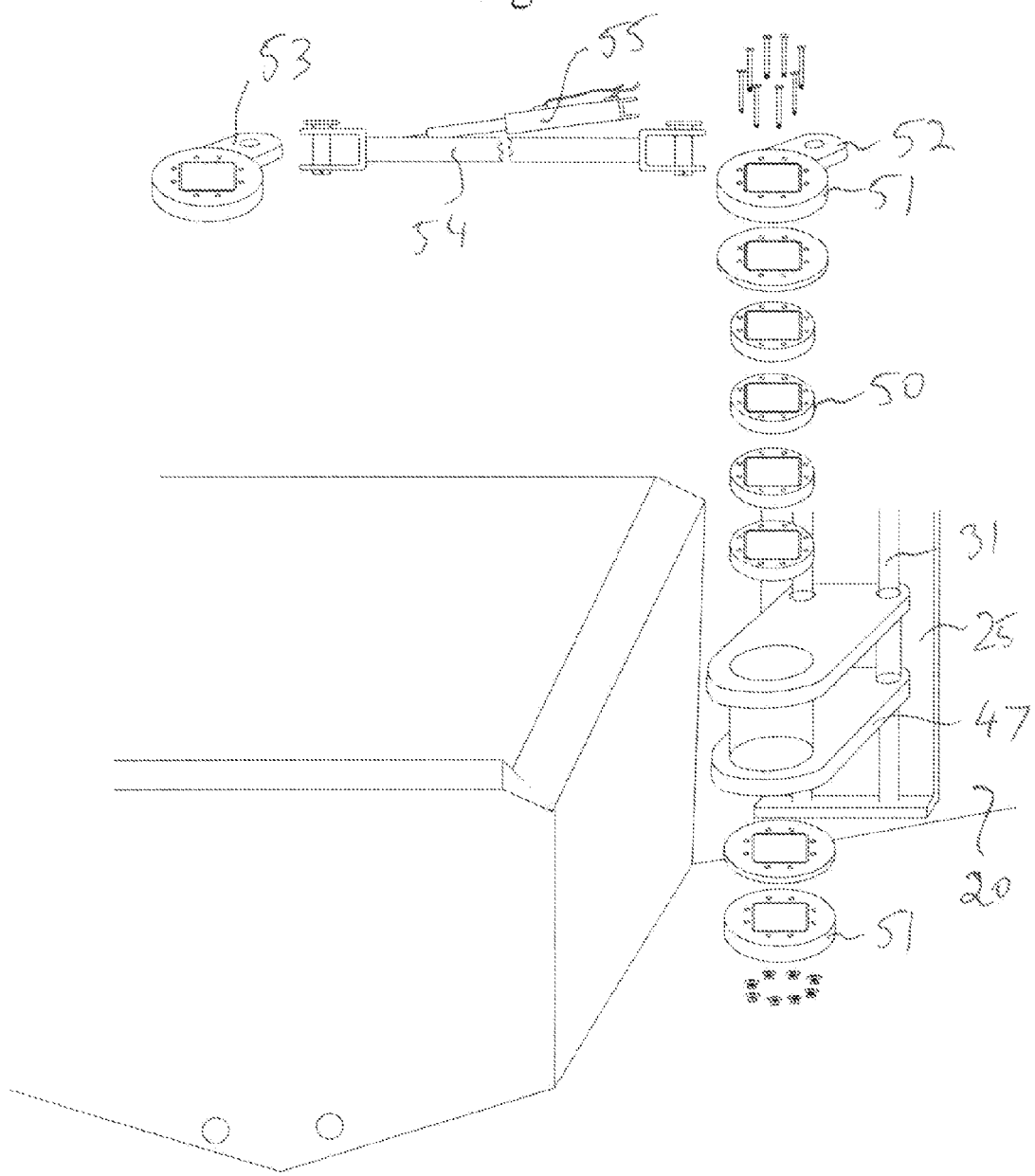

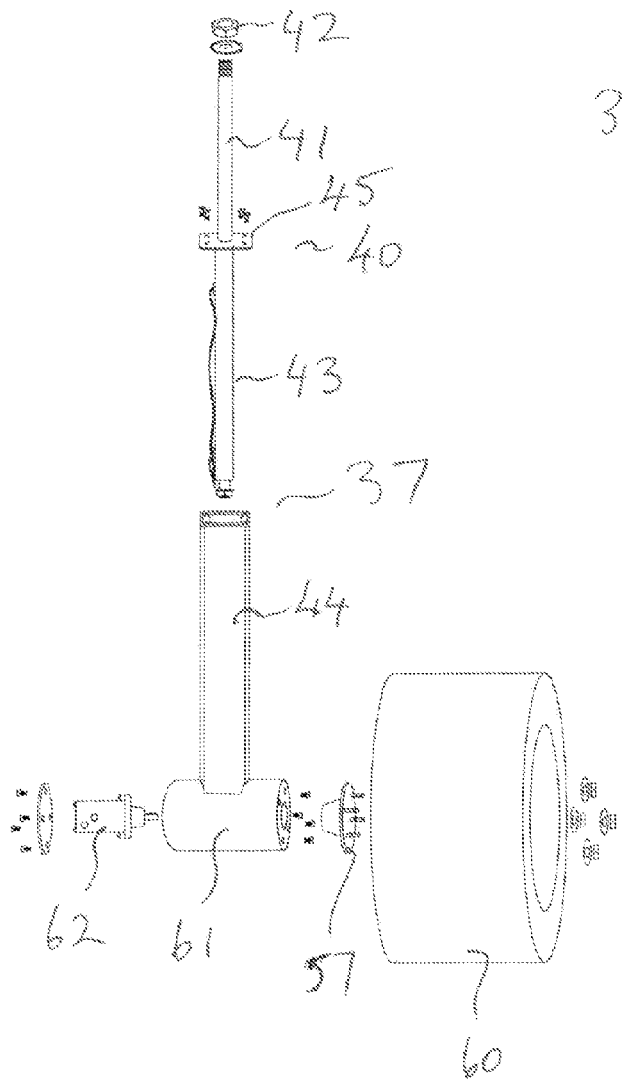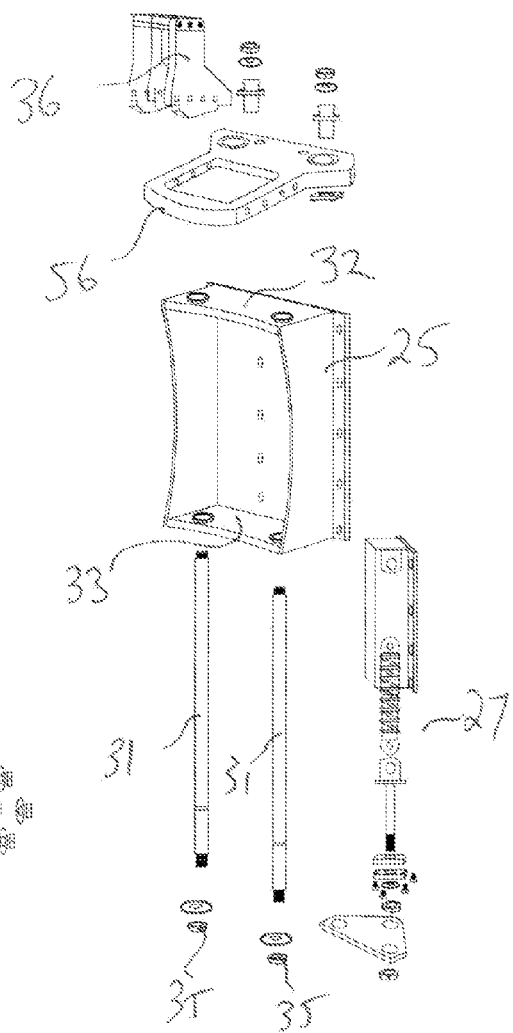

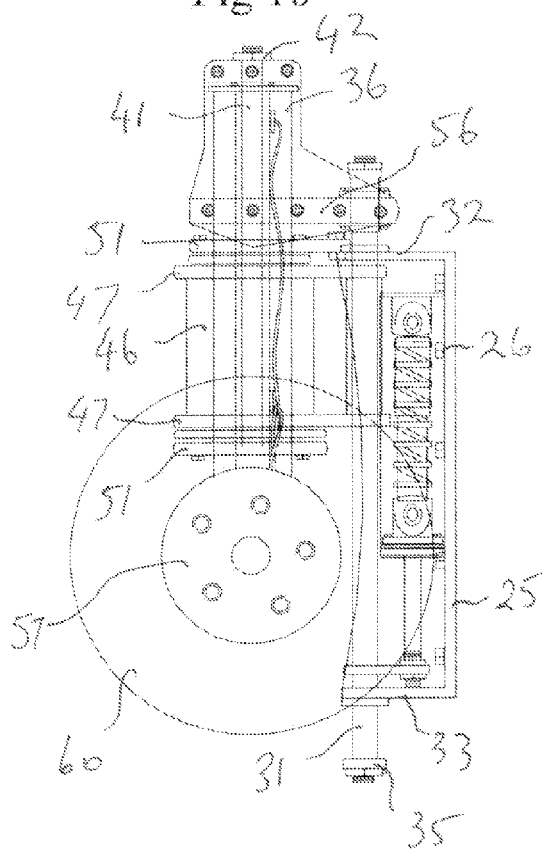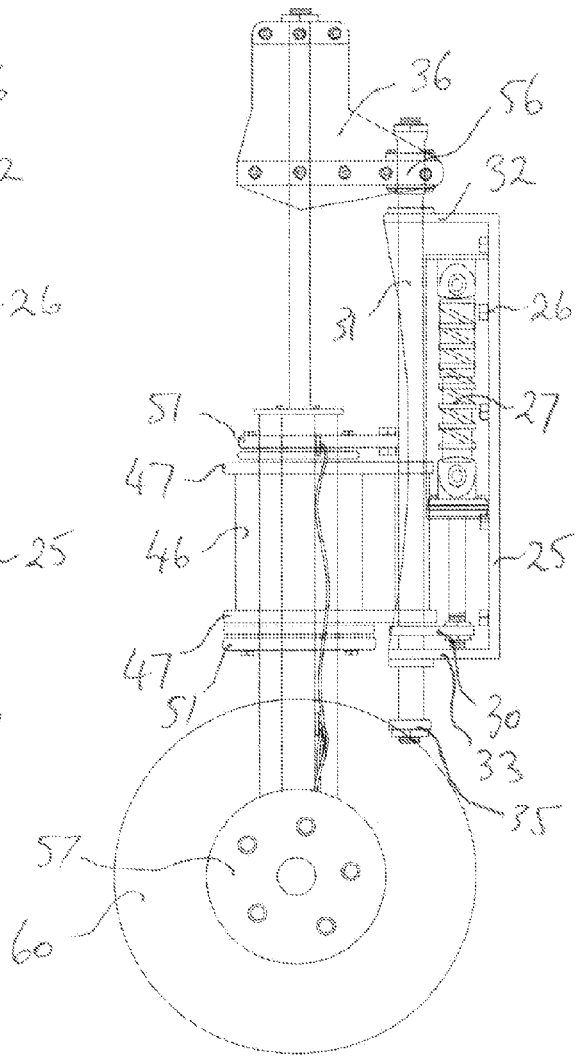

Fig 12
Fig 13
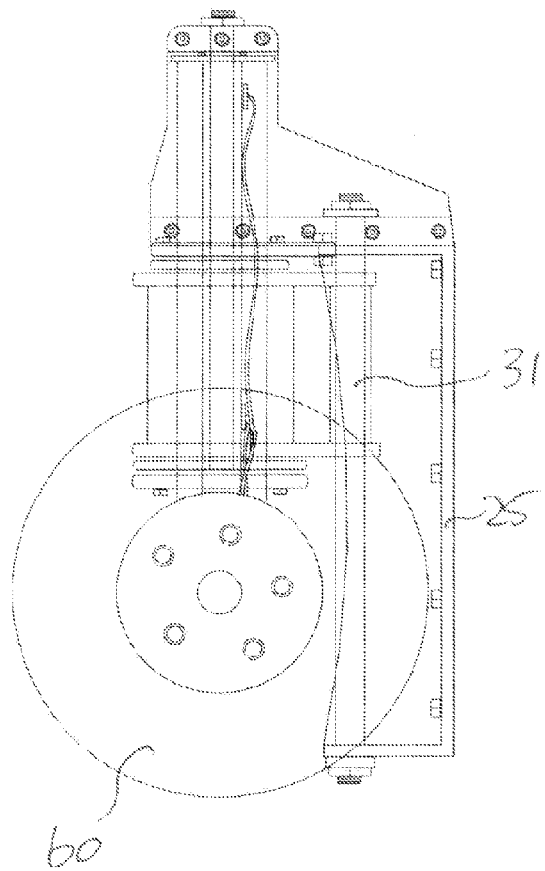
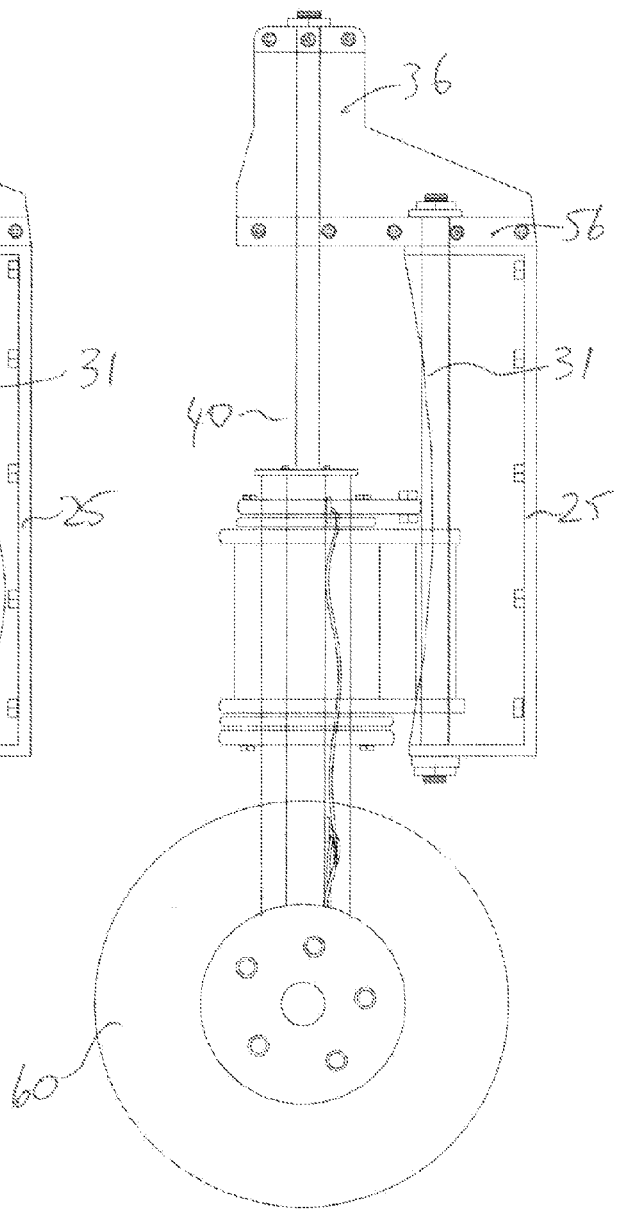

Fig 14
Fig 15
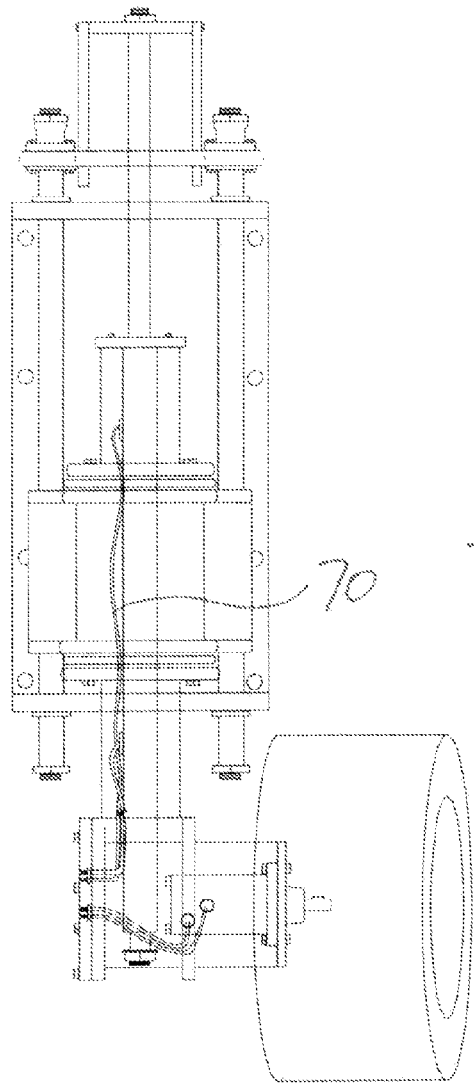
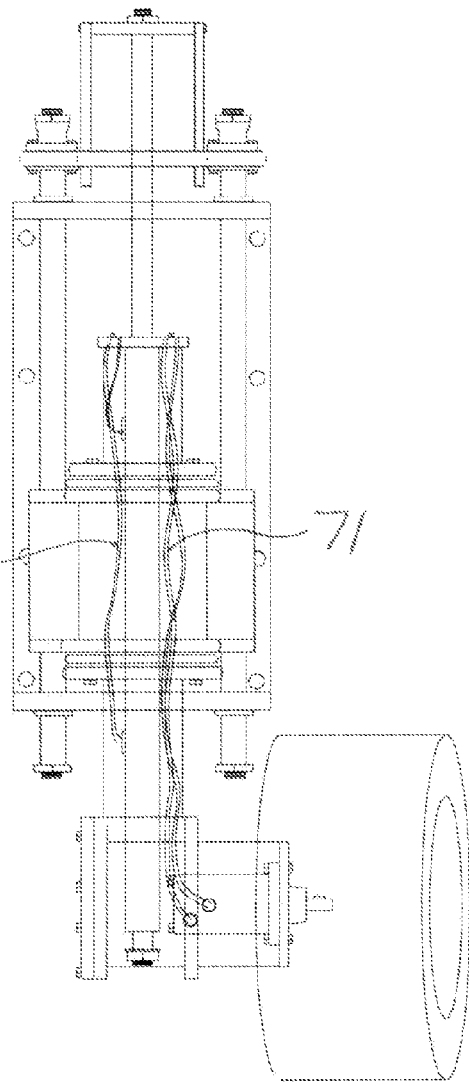

AMPHIBIOUS VEHICLE

FIELD OF THE INVENTION

This invention relates to an amphibious vehicle. This invention has particular application to an amphibious vehicle for use principally as a beachable pleasure or work boat, and for illustrative purposes the invention will be described with reference to this application. However we envisage that this invention may find use in other applications such as amphibious cargo vessel or landing craft.

BACKGROUND OF THE INVENTION

The reference to any prior art in this specification is not, and should not be taken as, an acknowledgement or any form of suggestion that the referenced prior art forms part of the common general knowledge in Australia.

Amphibious designs have advantages with safety in that the boat can just drive in and out of the water at boat ramps without the user exiting the boat in any way. Selected amphibians may also drive over sandbanks and the like.

AU 2004274363 B2 discloses a retractable leg assembly for an amphibious vehicle, comprising an adapter fitting that is fastenable to a bow of the vehicle; a leg that is pivotally connected to the fitting, and a linear actuator that is pivotally connected with a pivotal connection both to the fitting and to the leg. The linear actuator has a cylinder and an extendable rod, the cylinder being pivotally connected to the fitting at or adjacent a rod end of the cylinder. The actuator is configured to move the leg through an arc of travel (radial movement) from a retracted position to an extended position, whereby the pivotal connection of the actuator when extended, is located in front of the leg assembly, wherein the actuator is movable about its pivotal connection in a manner ensuring that a force exerted on the leg by the actuator in a direction that is tangential to the arc of travel of the leg remains substantially optimal during a greater portion of the arc of travel. The retractable leg assembly is a nose leg assembly located outside a hull of the amphibious vehicle without moving through an overall streamline or watertight skin of the hull, the actuator travelling in a recess provided in the hull.

AU 2002359096 B2 discloses an amphibious vehicle comprising:
  a hull extending in an aft direction from a bow to a stem; a leg assembly coupled to the bow, the leg assembly including:
  a wheel assembly having a wheel for engaging and rolling upon a surface; and
  an actuator for automatically rotating the leg assembly in a clockwise direction (radial movement) when viewing a starboard side of the hull to transition the wheel from a stowed position in which at least a portion of the wheel is disposed below a height of a top of the bow and in which at least a majority of the wheel is above a waterline of the hull to an extended position in which at least a portion of the wheel is disposed aft of a forward tip of the bow and in which at least a majority of the wheel is below the waterline of the hull to at least partially support the bow above the surface; and
  a steering system connected to the wheel assembly and adapted to selectively turn the wheel to provide controlled steerage to the hull while the hull moves upon the surface.

Described embodiments have a stern wheel coupled to the stern for engaging and rolling upon the surface, and a drive assembly for selectively rotating the stern wheel to drive the hull in a selected direction upon the surface.

A disadvantage of radial movement is that the boat jolts backwards and forwards as the legs act in a radial arc. Other designs using pivot movement are relying on the strength of the pivot point, which is fine for small lightweight boats. However, a larger, full bodied boat the single point of connection between boat and leg may be an engineering issue in terms of point loading. The radial movement is also under the heaviest pivot loading at the point of first contact with the surface, long before the contact patch is under the pivot point.

U.S. Pat. No. 4,008,679 discloses an amphibious boat that overcomes the radial movement problem. The hull of a motorboat is provided on its bottom with three recesses disposed in a tricycle arrangement, each housing a retractable landing wheel. At least one of the wheels is powered by a suitable fluid operated motor. Shutters are provided operatively associated with the retractable wheel, to close the wheel housing recesses each time the respective wheel is retracted in the recess, thus re-establishing the continuity of the hull bottom.

The disadvantage of this arrangement is the complexity of the shutter arrangement. The shutters must close positively and robustly to avoid peel forces on a planing hull under way. The wheel wells must be purged of flooding to get the boat up on to the plane, which requires additional horsepower to lift the weight of the flooded chambers. The chambers must be vented to drain, meaning that the chambers are necessarily flooded at rest, which in turn means that the undercarriage working parts are substantially permanently immersed. The wheel wells comprise a significant intrusion into the internal load spaces of the hull.

The tricycle undercarriages of the prior art are usually in the form of a one forward, two aft configuration, to reflect the physical configuration of a typical hull and to have regard to the dead weight of the motor on land. However, provision of a wheel well on the forward centreline disrupts keel and/or keel to stem knee region, a major contributor to forward hull strength and stiffness. This is particularly so in the case of conventional frame and stringer construction, but is also the case for monocoques built on partial bulkheads, which usually include stiffening keel and or stem analogues that are compromised by a nose wheel well. Tricycle undercarriages also have inherent roll-axis issues, tending designs to be narrow forward to reduce weight at a distance from the centreline.

SUMMARY OF THE INVENTION

In one aspect the present invention resides broadly in an amphibious vehicle including:
  a boat hull having a substantially transverse forward bulkhead spaced from a stem and a substantially transverse aft bulkhead forming a transom;
  a pair of undercarriage assemblies on each of said forward and aft bulkheads, spaced about a centreline of said hull, each undercarriage assembly having an extendable strut and a carriage wheel assembly at a lower end of said strut; and
  operating means associated with each strut and adapted to cooperatively cause said strut to move said wheel assembly from a first, stowed position substantially above a waterline of the hull under way, and a second, deployed position with the wheel assembly capable of supporting the boat hull on a ground surface.

The hull above the waterline under way adjacent the forward bulkhead may be relieved to either side of the keel provide a nesting recess into which the wheel parks in the stowed position. This enables the track to be consistent between the forward and aft pairs, while keeping the front track within the overall beam.

The transverse forward bulkhead may comprise port and starboard bulkhead portions, each raked aft from a substantially vertical centreline or collision bulkhead portion.

The transverse aft bulkhead may support a pod including spaced side walls extending aft of the aft bulkhead and an extension of the hull planing surface aft of the transom portions.

The undercarriage assembly may include resilient suspension means. The resilient suspension means may be selected from one or more of spring suspension and balloon tyres.

One or both pairs of the undercarriage assemblies may be steerable.

The undercarriage assembly may include a mounting portion secured to the respective bulkhead, the extendable strut being secured to the mounting portion. The extendable strut may be steerable relative to the mounting portion. The mounting portion may include a suspension portion supporting the extendable strut.

The extendable strut may comprise a double acting hydraulic ram.

One or more of the carriage wheel assemblies may include a hydraulic motor. Each undercarriage assembly may be substantially identical apart from being fitted for steering and/or a hydraulic motor. Each of the carriage wheel assemblies may include a hydraulic motor.

The wheel assembly will generally be a wheel and hub per se, but may also be selected from wheels bearing endless-track or belt assemblies.

The boat hull may comprise any hull construction included but not limited to frame and stringer construction, monocoque or stringers on full and partial bulkheads, frameless cold moulded and composite construction. The hull material may be wood planking, laminated composite, plate metal such as steel or aluminium, wood composite such as strip plank or cold moulded timber/epoxy, or plywood. The boat may be a monohull or multihull vessel.

The transverse forward bulkhead may comprise a collision bulkhead, anchor locker forward or aft wall or purpose-positioned bulkhead, or a bridge mounted bulkhead on a multihull. The hull above the waterline under way may be relieved to provide a nesting recess into which the wheel may park in the stowed position. This permits the use of a front track dimension that is within the beam dimension of the vessel. The relief of the hull is preferably watertight. The transverse forward bulkhead may comprise a substantially plane, vertical bulkhead. The transverse bulkhead may comprise port and starboard bulkhead portions, each raked aft from a substantially vertical centreline or collision bulkhead portion. The raking aft of the respective bulkhead portions may allow greater steering movement as described hereinunder.

The transverse aft bulkhead may form a raked or countered transom or may be substantially plumb to the keel line or centreline under way. The transverse aft bulkhead may support a pod including spaced side walls extending aft of the aft bulkhead. The extendable struts may be secured to the side walls to be supported on the transom. Preferable the struts are bolted directly to the transom.

The pod may comprise an extension of the hull planing surface aft of the transom portions. The planing surface extension may substantially continue at the deadrise of the adjacent hull at the transom or may flatten out. The pod may comprise a motor-supporting buoyant enclosure or motor well in outboard motor boats. Alternatively the pod may mount a leg in the case of an inboard stern drive arrangement or a fin or skeg supported rudder in the case of a shaft drive inboard engine arrangement.

The spaced side walls are preferably substantially parallel to make mounting of the struts for substantially vertical operation most straightforward. However, this ease is not prejudiced by the walls having some convergence in the aft direction. The walls may diverge upwardly if an increasing buoyancy cross section is required.

The respective pairs of extendable struts may be assembled to the forward bulkhead and transom by bolting or like assembly methods. There are strength advantages to this as well as ease of future maintenance. In the case of steel or aluminium bulkheads or transom, the bulkhead or transom may be fabricated to a strut upper component by welding, the bulkhead or transom incorporated into the hull structure, and the relatively-moving hydraulic components being assembled to the strut upper component. In order to provide sufficient travel, the upper portion of the strut may protrude above the normal deck level. This may be braced at the upper end (in the case of the forward struts) by extending the hull sides at the bow, and decking-in. Alternatively, the upper portions may be allowed to protrude. The protruding portions may be ascribed additional functions such as acting as twin Samson posts forward and post cleats aft.

The struts may comprise telescopic struts comprising extruded aluminium, which helps with keeping tolerances close, as the aluminium is extruded through a die which reproduces a product to exacting specifications over a specific length. The process is also a lot cheaper than casting the aluminium. The extruded strut components may be formed in a way to include slots for mounting linear bearing slides, recesses for bolt heads and inner chambers for running hosing and the like separate to other components. The extruded strut components in assembly may be articulated to provide for steering and/or aligning the ground transport assembly.

A hollow telescoping strut may have components such as hosing for motors and hydraulic rams directed internally up the leg instead of running outside with the ability to get caught on structures as the leg is retracted or extended.

The respective pairs of extendable struts may comprise a hydraulic strut where the substance of the strut is its hydraulically operated parts. Alternatively the strut may comprise structural parts operated by separable hydraulic actuators. The struts may be air, compressed-gas or vacuum-operated struts. The struts may be single stage, double acting struts. Alternatively, the struts may include two or more stages to reduce overall length for a given range of movement of the wheel assembly. For example the forward struts may have a two stage extension which has a hydraulic ram bringing down the outer extrusion as well as the inner extrusion, then the second stage is the inner extrusions coming down separately. This two stage process requires an extra hydraulic ram to operate the first stage, but will mean that all rams can be shorter in length, lowering overall height.

One or both of the forward or aft pair of struts may be steerable. The steering may be effected by rotation of the strut in a strut housing. Alternatively the steering angular motion may be provided between the telescopic sections of the strut. The steering may be coupled to a motor, leg or rudder steering system associated with the hull, or may be an independent wheel or joystick. Steering of the wheel assemblies may be linked with the steering of an outboard motor. An advantage of this is that the same helm wheel is used for both land and sea operations.

The front and rear wheel/strut assemblies may be manufactured using the same componentry, creating a more repetitive process and cutting down on costs. The track width of the front wheels may be comparable with the rear track to provide maximum stability.

The struts may comprise a selectively extendable wheel assembly made steerable by pivoting to a mounting portion adapted to be secured to the respective bulkhead. The mounting portion may include a resilient suspension component acting along the pivot axis. Alternatively, the pivot may be axially fixed relative to the mounting portion, wherein suspension may be associated with the extendable wheel assembly or may be provided by balloon tyres.

The operating means will be selected according to the nature of the strut operating parts such as air operation or hydraulic operation. For hydraulic operation, this may be a self-contained electric-over-hydraulic system operable from the boat's electrical supply. Alternatively the operating means may be a hydraulic power pack driven by the boat engine or an auxiliary engine. The operating means may include positive mechanical locking of the struts in the deployed position, which mechanical locks may be disengaged only when stowing movement is positively selected via the operating means. In some embodiments, the locks may be configured whereby the locks will only disengage when the struts are in the unloaded condition.

The struts may include suspension means such as a coaxial coil spring section. For example, the strut may comprise a coil spring over shock absorber strut, contained within the length of a leg assembly. The coil spring may alternatively form the upper portion of the suspension. A spring style suspension can be incorporated high in the leg, to keep the components away from constant spray of salt water. However, as this adds to strut length, it is preferred to provide coil and strut suspension concentrically. Where the strut is unsprung or limited springing, suspension may be provided in the form of low pressure balloon tyres on the wheels. The bigger heavier boats may be provided with suspension, whereas the lighter boats may not require it.

The wheel assembly located at the strut lower ends may be a driven wheel or an idler wheel. Driven wheels may be pressurized fluid motor hubs built in to the strut lower end, or may be a separable pressurized fluid motor assembled to the strut lower end. The pressurized fluid motor may comprise a hydraulic motor or a pneumatic motor.

The hydraulic motor may be housed in a motor housing to not only protect the motor from the salt water environment, but also to form a structural part of the componentry, allowing the motor to be strongly mounted to the strut assembly. The motor housing being a structural part of the strut assembly means that even if the leg doesn't have a drive motor attached it is still manufactured as standard, leaving the ability for the customer to upgrade to incorporate a drive motor at a later date with minimal fuss as the housing and mounting holes are already there.

The pressurized fluid motor may be powered by a power pack operating independently of the main boat engine. Alternatively the power pack may be driven off the main or auxiliary marine engine, provided that this is provided with radiative cooling means to provide at least a limited amount of overland operation. For example the freshwater cooling system may comprise keel pipes having a finned portion for in-air use. The power pack may provide both motive force for the wheels and the operating means for the struts. In this case there is preferably provided a proportioning valve and/or lock-out whereby the wheels cannot be engaged for rotation unless the struts are locked in a fully deployed position.

Where an auxiliary motor is provided for a petrol outboard powered boat, this may comprise an unleaded auxiliary motor using the same fuel tank as the outboard motor. Auxiliary motor and pump may be mounted inside the rear lounge and may also be recessed under the floor to keep the weight of the motor as low as possible. The lounge motor box may be provided with appropriate sound and thermal insulation and positive air circulation for air cooling.

The wheels may be mounted on axles located substantially at the extending axis of the strut. However, the strut lower end may include means to impose a trailing position of the axle. For example the strut lower end may include an offset aft of the axle such that a wheel and tyre mounted on the axle may be lifted clear of the deadrise at the transom without the tyre fouling the transom lower edge.

BRIEF DESCRIPTION OF THE DRAWINGS

The invention will be described with reference to the following non-limiting embodiment of the invention as illustrated in the drawings and wherein:

FIG. 1 is a side view of apparatus in accordance with the present invention, undercarriage operatively raised;

FIG. 2 is a side view of the apparatus of FIG. 1, undercarriage operatively lowered;

FIG. 7 is an exploded detail view of a steerable right rear undercarriage;

FIG. 8 is an exploded detail view of a wheel and leg assembly, wheel motor exposed;

FIG. 9 is an exploded detail view of mounting body assembly incorporating spring suspension;

FIG. 10 is a view of a sprung wheel and leg assembly suitable for use in the apparatus, operatively retracted;

FIG. 11 is a view of the wheel and leg assembly of FIG. 10, operatively deployed;

FIG. 12 is a view of an unsprung wheel and leg assembly suitable for use in the apparatus, operatively retracted;

FIG. 13 is a view of the wheel and leg assembly of FIG. 12, operatively deployed;

FIG. 14 is a front view of a leg assembly showing hydraulic hosing inside the leg; and FIG. 15 is a front view of a leg assembly showing hydraulic hoses being directed to the top of the leg.

Figure 3:
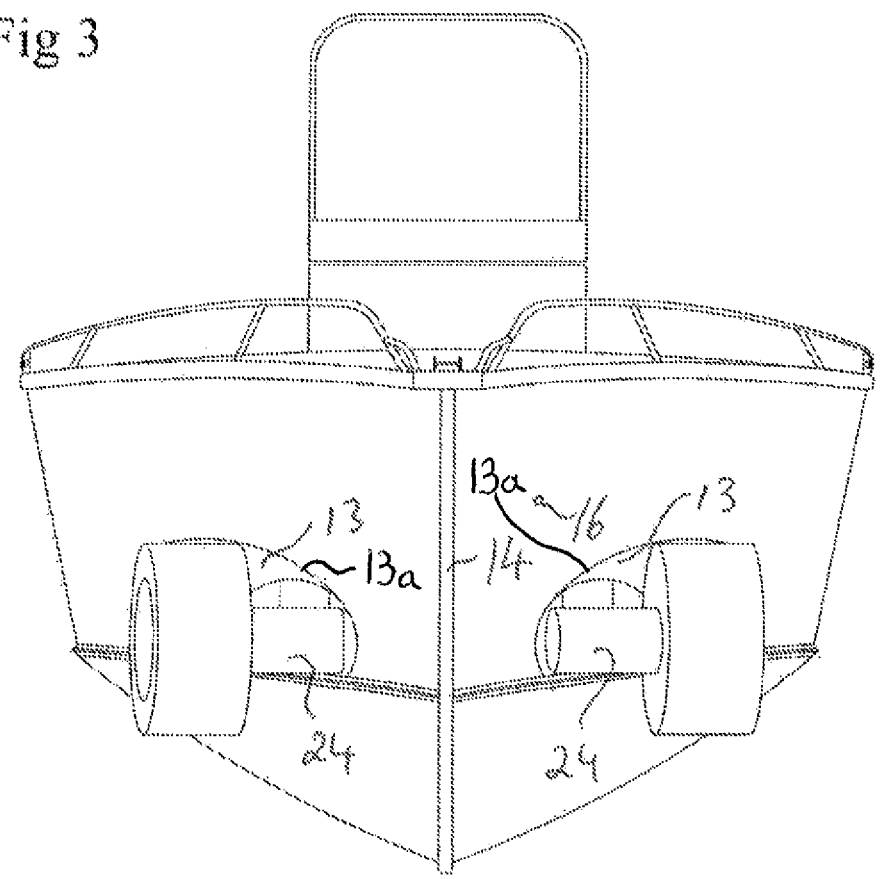
FIG. 3 is a front view of the apparatus of FIG. 1, undercarriage operatively retracted.
Figure 4:
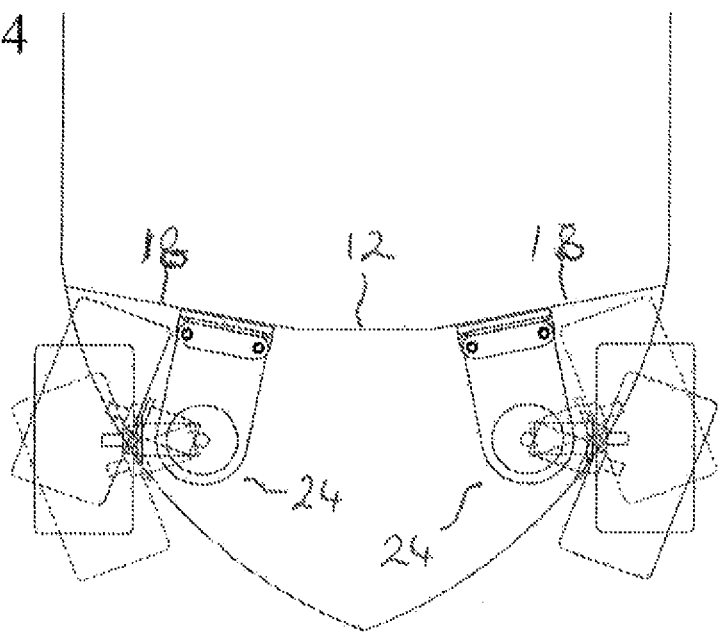
FIG. 4 is a plan view of the apparatus of FIG. 1, illustrating the steerable geometry of the front undercarriage.

In the figures there is provided an amphibious vehicle including a plate aluminium planing boat hull 10 having high topsides forward 11. The forward scantlings include a transverse collision bulkhead 12. The topsides forward 11 have formed therein a pair of recesses 13 disposed each side of the stem 14, with the outer end of each recess defining an opening 13a in the hull. An anchor locker 15 is drained by drain hole 16. The transverse collision bulkhead 12 has port and starboard raked portions 18 to promote wheel articulation as described hereunder.

A transom assembly includes port 17 and starboard 20 transom portions of an aft bulkhead and located at either side of a central pod 21 comprising a buoyant motor or stern leg mount and extending the planing surface 22 of the hull aft. The pod 21 has substantially vertical side wall portions 23.

The collision bulkhead raked wings 18 and the port 17 and starboard 20 transom portions support bolted-on respective pairs of spaced extendable strut and wheel assemblies 24. The extendable wheel assemblies 24 as illustrated in FIGS. 1 to 6 are best described by FIGS. 8 to 11 in their detail.

As illustrated in FIGS. 8 to 11, an extendable wheel assembly 24 comprises a mounting bracket 25 secured to a respective raked wing 18 or transom portion 17, 20 by bolts 26. A coil spring over shock absorber assembly 27 is bolted into the mounting bracket 25 and includes a transmission plate 30 locked to a pair of spaced suspension rods 31. The spaced suspension rods 31 are bushed into the top 32 and bottom 33 walls of the mounting bracket 25, the suspension rods 31 extending through the bottom wall 33 by an extent to provide for suspension travel, limited by limit stop 35.

The upper ends of the suspension rods are secured to a header assembly 36 via cantilever bracket 56. The header assembly 36 forms the upper mount for a wheel strut assembly 37 consisting of double acting hydraulic ram 40 having an upper piston 41 secured to the header assembly 36 by nut 42, and a lower cylinder 43 secured to a strut casing 44 by bolting plate 45. The strut casing 44 is of square section and passes through the centre of a bearing pack assembly 46 having upper and lower bearing pack retainers 47 mounted slidably to the suspension rods 31 within the bracket 25 and mutually spaced by square-bore spacers 50. Upper and lower cap bolt plates 51 secure the upper and lower bearing pack retainers 47 to the stack of square-bore spacers 50.

The square bore spacers 50 may have an outer bearing surface where the assembly is steerable, as per FIG. 7, showing a steerable rear leg embodiment on a raked starboard transom portion 20. The upper cap bolt plate 51 in this embodiment has a crank arm 52 interoperable with a corresponding portside crank arm 53 by steering rod 54 and hydraulic double acting steering ram 55.

A non-steering embodiment may be a steering embodiment such as that illustrated in FIG. 7, rendered inoperable to steering by bolting the crank arm 52 to the upper plate 47 through a bolt hole. The bolt hole in the plate 47 may be a slotted hole to permit alignment adjustment of the non-steering embodiment before tightening the bolt.

The strut casing 44 may have internals supporting a driven wheel 57 mounting a balloon tyre 60, as illustrated in FIG. 8. The lower end of the strut casing 44 has a wheel carrier assembly 61 having a hydraulic motor 62.

Figure 5:
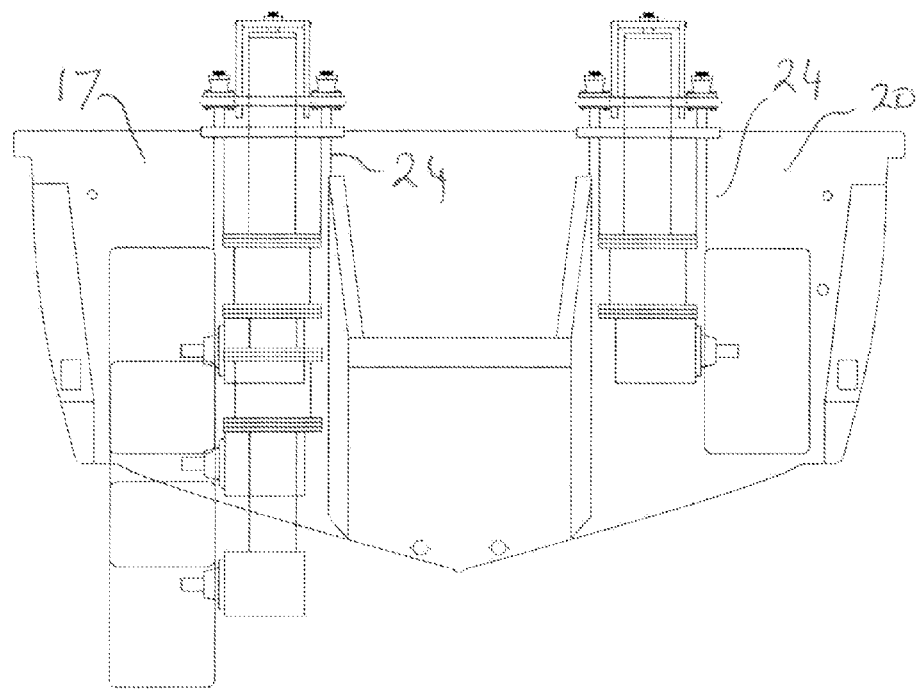
FIG. 5 is a rear view of the apparatus of FIG. 1, left undercarriage operatively lowered and right undercarriage operatively raised.
Figure 6:
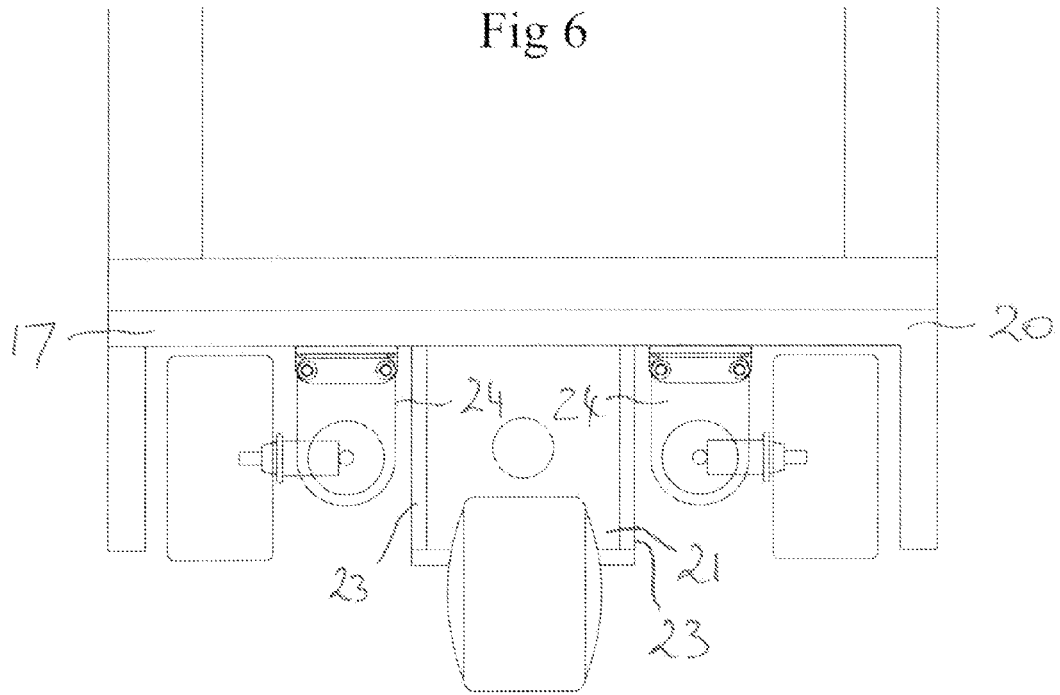
FIG. 6 is a plan view of the apparatus of FIG. 5.

With specific reference to FIG. 5 and FIG. 6, these are rear and top view of rear wheels showing different stages of the leg extending. Also this shows the wheel at a retracted point above the bottom of the hull to allow for clearance of the hull for seagoing use when under way. The top view FIG. 6 shows the pod and outboard motor mounted between the leg assemblies. No allowance for rear steerage has been given on the top view so the wheels can hug the rear bulkhead. If steerage is allocated for the rear wheels the bulkhead may be of an angled design as illustrated in FIG. 7, or the assembly lengthened to allow clearance.

With specific reference to FIG. 7, the bearing pack design allows the hydraulic leg to go up and down and turn in the housing and be well supported during its operation. The inner of the bearings are square and fit the shape of the square leg with close tolerance. The leg may be turned in a controlled fashion because the outer of the bearings are round and fit a round housing.

The inner bearings fit inside the housing with larger bearings sitting on top and underneath the housing on the flat of the structure. Metal plates then join the whole assembly together via bolts going through the entire pack, which creates strength within the assembly.

When the metal plates are turned via a hydraulically operated shaft, steerage of the leg is achievable as the square inner shape of the bearing moves the square leg. If the shaft is connected in the same way to another parallel leg then both legs and wheel assemblies can be turned in a controlled fashion. As both front and rear leg assemblies are of the same design they both have the ability to be steered.

It is favourable to steer the front set of wheels only but could be optional to be four-wheel steer. The set of wheels that are not steered can be set for alignment using the same turning principle, but locked when wheel alignment is achieved.

In the specific embodiment of FIG. 8 the strut casing 44 is comprised of extruded square tube with the hydraulic ram 40 mounted inside and sealed at the top from water ingress. The square strut casing 44 is attached to the motor housing, which allows the hydraulic motor to be mounted inside, and sealed front and rear from water ingress. All hosing supplying the hydraulic parts are run internally and exit using means which allow the working parts to be fully sealed. A hub and wheel are then bolted to the drive motor. The assembly design should be kept the same regardless of whether the wheel is driven or not so owners can upgrade to extra drive motors at a later point. Favourably drive motors should be mounted on the rear legs, but can also be mounted on the front to give three or four wheel drive.

In the embodiment of FIG. 9, the exploded view shows the main structural body, which holds all the components of the leg, is mounted to the forward and aft main bulkheads. This mounting body is shown with stainless steel shafts, top ram mounting assembly, and suspension components.

In FIG. 10 and FIG. 11, this shows the leg in its entirety with both retracted and extended views. The leg assembly is extended and retracted via a hydraulic ram mounted inside the leg. The main bearing pack and housing slide up and down the two stainless steel shafts mounted within the structural body. This movement allows the leg to be well supported when it is extended all the way down, but also allows the wheel to be retracted up out of the water above the planing surface of the hull. The steering arm of the main bearing pack has clearance to allow for full steering movement regardless of the extension or retraction of the leg. This is necessary so the steering can be integrated with the outboard motor steering allowing for easier usability via the same steering wheel. The hydraulic ram is mounted at the top via the structure at the head. This structure solidly mounts to the two stainless steel shafts going through the structural body. At the lower end of the stainless steel shafts is a solid mounting for the suspension shaft, which is attached with adjustable means to a coil-over shock absorber. None of these shafts are solidly mounted to the main structural body.

The shock absorber is contained in a sealed housing which allows the shaft to enter at the bottom via a waterproof seal. This shock absorber housing is solidly mounted to the main body. All the shafts are joined in unison so when the wheels extend to the ground and the weight of the boat is taken up the force is exerted in an upward direction with the coil-over shock absorber taking the entire load. The main stainless steel shafts need to be extended through the bottom of the body so as to allow for suspension travel.

The main bearing pack housing is contained between the plate at the top of the leg pushing down, and the plate at the bottom for the suspension shaft. So if the wheel goes over a bump all leg components go up and down as one, which alleviates excessive wear.

In the alternative embodiment of FIG. 12 and FIG. 13, there is a view of an extended and retracted leg with no suspension other than the flexing of the tyre wall 60. The two stainless steel suspension struts 31 and the header assembly 36 and cantilever bracket 56, are solidly mounted to the main structural bracket 25, which only allows movement up and down via the hydraulic ram 40. Some structural components may need to be stronger to allow for the lack of give in the leg as a unit. This option is a cost effect way of setting up the leg assembly. Most components are still common to a suspension system so this style of leg can be upgraded.

In the embodiment of FIG. 14, there is a front view of the leg assembly showing hydraulic hosing 70 inside the leg. These are two examples of how the hosing can be run depending on the application. First example shows hosing being directed to the bottom of the leg and being run out through the end keeping the legs sealed from water ingress.

In the embodiment of FIG. 15, a second example shows hydraulic hoses 71 being directed to the top of the leg. Both means are acceptable depending on how effective the exterior hosing can be joined up and still allow full movement of the leg.

The respective telescoping and wheel motor operation is controlled by a single hydraulic power pack driven by an auxiliary air cooled engine. The power pack provides both motive force for the wheels and the operating means for the struts. There is provided a proportioning valve whereby the wheels cannot be engaged for rotation unless the struts are in a fully deployed position. The auxiliary motor is petrol fuelled to be of common fuel with a petrol outboard engine. The auxiliary motor and pump is mounted inside the rear lounge (not shown) and is recessed under the floor to keep the weight of the motor as low as possible.

Apparatus in accordance with the foregoing embodiments have specific advantages. This invention allows for the incorporation of modern automotive suspension techniques to be utilized in an amphibian leg design. This invention allows for the use of a large volume vessel to be used as a basis for the amphibian model. This invention can be a very effective off road vehicle, utilizing four-wheel drive, four-wheel independent suspension and four wheel steering. It can utilize off-the-shelf components, which ultimately result in cost savings, because of the fully sealed housing designs within the assembly. This sealed design opens more possibilities as far as driving both ram and wheel by means other than hydraulics, e.g. electric, pneumatics. It uses design which allows the driver of the vessel to visually see what is happening with the legs at all times, because of movement of the head as a part of the suspension during operation, and the top of the leg being visual as it retracts into the head when fully up. The keel line is not penetrated by any of the undercarriage parts, contributing to structural integrity as a vessel.

The wider the footprint from boat to ground, the better stability. So with two leg and wheel assemblies integrated into the front nose a larger volume boat can be safely used because of the wider wheel track.

The type of boat that will gain from the amphibious design is the everyday user style of boat with large volume, high sides and width that can accommodate families and give a feeling of safety.

With the safety aspect in mind the commercial success of the product should be directed at the everyday family/boatie who require a large volume boat as a basis, which the linear style retractable legs are suited for. The embodied designs would also attract commercial and rescue operators because of its unique ability in the marine environment.

It will of course be realised that while the above has been given by way of illustrative example of this invention, all such and other modifications and variations thereto as would be apparent to persons skilled in the art are deemed to fall within the broad scope and ambit of this invention as is set forth in the claims appended hereto.

The invention claimed is:

1. An amphibious vehicle including:
   a boat hull having a substantially transverse forward bulkhead spaced from a stem and also having a substantially transverse aft bulkhead forming a transom;
   a pair of undercarriage assemblies associated with each of said forward and aft bulkheads, each undercarriage assembly having a linearly extendable strut assembly and a carriage wheel assembly at a lower end of said extendable strut assembly, a forward pair of said undercarriage assemblies each being supported on a forward face of said forward bulkhead and spaced about a centerline of said hull with each extendable strut assembly being selectively operable to move a carriage wheel of said carriage wheel assembly between (i) a deployed position so as to be operable for supporting said hull on a surface and (ii) a retracted position, the spacing of said forward pair of undercarriage assemblies and the length of said extendable strut assemblies being selected to locate said carriage wheel above a planing waterline of said hull in said retracted position, an aft pair of said undercarriage assemblies being supported on an aft face of said transom; and
   a pair of recesses, each said recess spaced athwart said stem to leave the stem unbroken, each said recess formed in a respective side of said hull and having received therein a portion of a respective undercarriage assembly of said forward pair of undercarriage assemblies, each said recess also being watertight to the inside of said hull and having an end defining an opening in said hull which is located entirely above said planing waterline of said hull.

2. The amphibious vehicle according to claim 1, wherein the transverse forward bulkhead comprises port and starboard bulkhead portions, each raked aft from a substantially vertical centerline or collision bulkhead portion.

3. The amphibious vehicle according to claim 1, wherein the transverse aft bulkhead supports a pod including spaced side walls extending aft of the aft bulkhead and an extension of the hull planing surface aft of the transom.

4. The amphibious vehicle according to claim 1, wherein each undercarriage assembly includes one or both of a spring suspension and a balloon tire.

5. The amphibious vehicle according to claim 1, wherein one or both pairs of said undercarriage assemblies are steerable.

6. The amphibious vehicle according to claim 1, wherein each undercarriage assembly includes a mounting portion secured to the respective bulkhead, said extendable strut assembly being secured to said mounting portion.

7. The amphibious vehicle according to claim 6, wherein said extendable strut assembly is steerable relative to said mounting portion.

8. The amphibious vehicle according to claim 6, wherein said mounting portion includes a suspension portion supporting said extendable strut assembly.

9. The amphibious vehicle according to claim 6, wherein said extendable strut assembly comprises a double acting hydraulic ram.

10. The amphibious vehicle according to claim 6, wherein one or more of said carriage wheel assemblies includes a hydraulic motor.

11. The amphibious vehicle according to claim 10, wherein each said undercarriage assembly is substantially identical apart from being fitted for steering or a hydraulic motor.

12. The amphibious vehicle according to claim 10, wherein each said carriage wheel assembly includes a hydraulic motor.

13. The amphibious vehicle according to claim 1, wherein said respective pairs of undercarriage assemblies have substantially the same track width.

14. The amphibious vehicle according to claim 1 wherein the carriage wheel of each of said forward pair of said undercarriage assemblies in the retracted position includes a portion which protrudes from the respective recess.

* * * * *